United States Patent
Pineau

(10) Patent No.: US 10,550,227 B2
(45) Date of Patent: Feb. 4, 2020

(54) POLYAMIDES BASED ON AMINOALKYLPIPERAZINE OR AMINOARYLPIPERAZINE FOR HOT-MELT ADHESIVES

(71) Applicant: Arkema France, Colombes (FR)

(72) Inventor: Quentin Pineau, Evreux (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/322,934

(22) PCT Filed: Jun. 22, 2015

(86) PCT No.: PCT/FR2015/051650
§ 371 (c)(1),
(2) Date: Dec. 29, 2016

(87) PCT Pub. No.: WO2016/001512
PCT Pub. Date: Jan. 7, 2016

(65) Prior Publication Data
US 2017/0130000 A1    May 11, 2017

(30) Foreign Application Priority Data

Jul. 1, 2014 (FR) ..................................... 14 56244

(51) Int. Cl.

| | |
|---|---|
| *C08G 69/26* | (2006.01) |
| *C09J 177/06* | (2006.01) |
| *C08L 77/08* | (2006.01) |
| *C09J 179/04* | (2006.01) |
| *C08L 77/06* | (2006.01) |
| *C08G 69/36* | (2006.01) |
| *C08G 69/40* | (2006.01) |
| *C08G 73/06* | (2006.01) |
| *C08L 79/04* | (2006.01) |

(52) U.S. Cl.
CPC ........... *C08G 69/265* (2013.01); *C08G 69/36* (2013.01); *C08G 69/40* (2013.01); *C08G 73/0633* (2013.01); *C08L 77/06* (2013.01); *C08L 77/08* (2013.01); *C08L 79/04* (2013.01); *C09J 177/06* (2013.01); *C09J 179/04* (2013.01)

(58) Field of Classification Search
CPC ........ C08G 69/36; C08G 18/603; C08L 79/04
See application file for complete search history.

(56) References Cited

U.S. PATENT DOCUMENTS

| | | | |
|---|---|---|---|
| 3,377,303 A | 4/1968 | Peerman et al. | |
| 3,404,941 A | 10/1968 | Berger et al. | |
| 3,738,950 A | 6/1973 | Sturwold et al. | |
| 3,847,875 A | 11/1974 | Drawert et al. | |
| 4,153,784 A | 5/1979 | Horn et al. | |
| 4,717,746 A | 1/1988 | Leoni et al. | |
| 6,008,313 A * | 12/1999 | Walker | C08G 59/4014 525/420.5 |
| 2009/0291288 A1 * | 11/2009 | Kopannia | C08J 5/128 428/220 |

FOREIGN PATENT DOCUMENTS

| | | | |
|---|---|---|---|
| CA | 815 099 A | | 6/1969 |
| DE | 2509736 | * | 9/1976 |
| GB | 970564 A | | 9/1964 |
| GB | 1 585 387 A | | 3/1981 |
| JP | 11-166121 A | | 6/1999 |
| JP | 2007-231087 A | | 9/2007 |
| WO | WO 2014/053786 A1 | | 4/2014 |

OTHER PUBLICATIONS

International Search Report (PCT/ISA/210) dated Sep. 14, 2015, by the French Patent Office as the International Searching Authority for International Application No. PCT/FR2015/051650.

* cited by examiner

*Primary Examiner* — Gregory Listvoyb
(74) *Attorney, Agent, or Firm* — Thomas F. Roland

(57) ABSTRACT

A semi-crystalline polyamide including at least one monomer resulting from the condensation of a diacid and of a diamine of formula AP.Y, the semi-crystalline polyamide having the following general formula (I): AP.Y/(A)m/(Pip.Y')n/(B.Y")q and the semi-crystalline polyamide having an Mp1 less than or equal to approximately 150° C., in particular less than or equal to approximately 130° C., in particular less than or equal to approximately 120° C. and/or a Tg less than or equal to approximately 60° C., in particular less than or equal to approximately 50° C., in particular less than or equal to approximately 40° C., as determined respectively by DSC according to standard ISO 11357-3 (2013) and ISO 11357-2 (2013).

6 Claims, 5 Drawing Sheets

POLYAMIDES BASED ON AMINOALKYLPIPERAZINE OR AMINOARYLPIPERAZINE FOR HOT-MELT ADHESIVES

The present invention relates to novel semicrystalline (co)polyamides based on aminoalkylpiperazine or aminoarylpiperazine, in particular based on aminoethylpiperazine, having a melting point ($Tm_1$) less than or equal to about 150° C. and/or a glass transition temperature (Tg) less than or equal to about 60° C. for preparing hot-melt adhesives that are resistant to washing, notably machine washing. The present invention also relates to compositions comprising said (co)polyamides.

It also relates to the use of aminoalkylpiperazine or aminoarylpiperazine, in particular of aminoethylpiperazine, for preparing semicrystalline (co)polyamides having a melting point ($Tm_1$) less than or equal to about 150° C. and/or a glass transition temperature (Tg) less than or equal to about 60° C. or compositions comprising said (co)polyamides.

It also relates to the use of said (co)polyamides for manufacturing a water-resistant hot-melt adhesive, in particular a thin sheet, a film, granules, a filament, a mat, a powder or a suspension.

It also relates to said hot-melt adhesives and their use in the textile industry, notably for assemblies or glued materials that are resistant to washing.

The copolyamides for preparing hot-melt adhesives (HMAs) have the drawback that they do not withstand washing, especially machine washing, notably above 60° C.

The hot-melt adhesives require a low melting point, but this characteristic is incompatible with ability to withstand washing. To lower the melting point of a copolyamide it is necessary to increase the number of monomers present in the copolyamide.

Thus, a 6/12 copolyamide has a minimum $Tm_1$ of 125° C. and a 6/6.6/12 copolyamide has a minimum $Tm_1$ of 110° C.

To get below 110° C., it is necessary to add a fourth monomer to obtain a quaternary copolyamide. However, this last-mentioned copolyamide loses its crystallinity and its resistance to machine washing, especially at 60° C.

Moreover, several patents (U.S. Pat. Nos. 3,377,303, 3,738,950, 3,847,875) describe polyamides formed by the condensation of fatty acid dimers with diamines of the piperazine type for preparing hot-melt adhesives capable of adhering to polymeric vinyl substrates in the presence of a plasticizer. The monomers of the piperazine type used are symmetric and the hot-melt adhesives obtained have a softening point above 125° C., in particular between 135° C. and 160° C., necessary for obtaining good adherence on vinyl substrates and consequently a melting point above these values. However, they are not resistant to washing, especially machine washing.

U.S. Pat. No. 4,717,746 describes the use of polyamide resins formed by the condensation of fatty acid dimers with diamines of the asymmetric piperazine type as plastisol adhesion promoter giving colour stability during thermal treatment of the plastisol for application thereof. The polyamide is not only used as adhesive as such. There is therefore a need for hot-melt adhesives simultaneously possessing properties of flexibility or pliability, resistance to washing and ease of use, and notably having a moderate melting point.

The applicant has solved the various problems of the prior art by supplying a composition comprising a copolyamide with amide units, where at least one of the monomers is derived from the condensation of a diamine of the asymmetric piperazine type and a diacid, said copolyamide being semicrystalline, having a melting point ($Tm_1$) less than or equal to about 150° C. and/or a Tg less than or equal to about 60° C., allowing hot-melt adhesives to be prepared that have properties of flexibility or pliability, resistance to washing, notably machine washing, and ease of use.

The present invention therefore relates to a semicrystalline polyamide comprising at least one monomer resulting from the condensation of a diacid and a diamine of formula AP.Y, in which:
AP represents at least one asymmetric diamine monomer of the piperazine type of the following formula:

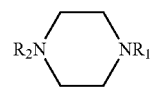

in which:
$R_1$ represents H or —$Z_1$—$NH_2$ and $Z_1$ represents an alkyl, a cycloalkyl or an aryl having up to 15 carbon atoms, and
$R_2$ represents H or —$Z_2$—$NH_2$ and $Z_2$ represents an alkyl, a cycloalkyl or an aryl having up to 15 carbon atoms,
$R_1$ and $R_2$ being different from one another, and
Y represents at least one dicarboxylic acid excluding the dimers and/or trimers of fatty acids,
said semicrystalline polyamide having the following general formula (I):

$$AP.Y/(A)_m/(Pip.Y')_n/(B.Y'')_q \qquad (I)$$

in which:
A represents at least one polyamide with a long-chain aliphatic unit,
Pip denoting piperazine and Y' represents at least one dicarboxylic acid excluding the dimers or trimers of fatty acids, and Y and Y' may be identical or different,
B represents at least one polyether unit, notably derived from at least one polyalkylene ether polyol or polyalkylene ether polyamine, notably a polyalkylene ether diol or a polyalkylene ether diamine, or a mixture thereof,
Y" represents at least one dicarboxylic acid excluding the dimers and/or trimers of fatty acids, and Y" may be identical to or different from Y and/or Y',
m, n and q=0 or 1, and
said semicrystalline polyamide having a $Tm_1$ less than or equal to about 150° C., notably less than or equal to about 130° C., in particular less than or equal to about 120° C. and/or a Tg less than or equal to about 60° C., in particular less than or equal to about 50° C., notably less than or equal to about 40° C., as determined by DSC according to standard ISO 11357-3:2013.

Throughout the description, the term polyamide (PA) denotes a homopolyamide or a copolyamide, i.e. the products of condensation of lactams, amino acids and/or diacids with diamines.

The term "monomer" in the present description of the polyamides is to be understood in the sense of "repeating unit". The case when a repeating unit of the polyimide consists of the association of a diacid with a diamine is a special case. It is considered that it is the association of a diamine and a diacid, i.e. the diamine, diacid pair (in equimolar amount), that corresponds to the monomer. This is explained by the fact that, individually, the diacid or diamine is only one structural unit, which is not sufficient by itself to polymerize. In the case when the polyamides according to the invention comprise at least two different monomers, called "co-monomers", i.e. at least one monomer and at least one co-monomer (monomer different from the first monomer), they comprise a copolymer such as a copolyamide, abbreviated to COPA.

Regarding AP.Y:

AP denotes an asymmetric diamine monomer of the piperazine type, i.e. the piperazine only has a single nitrogen atom of the ring bearing a hydrogen.

The other nitrogen atom of the ring is substituted with a function $Z_1NH_2$ or $Z_2NH_2$, $Z_1$ and $Z_2$ representing an alkyl.

The term "alkyl" denotes, throughout the description, a linear or branched alkyl. Advantageously, the term alkyl denotes a methyl, ethyl, propyl, butyl, pentyl or hexyl as well as isomers thereof.

We would remain within the scope of the invention if $Z_1$ or $Z_2$ represents an alkene or an alkyne having up to 15 carbon atoms.

Advantageously, the term "cycloalkyl" denotes a cyclopentane or a cyclohexyl.

Advantageously, the term "aryl" denotes a phenyl or a biphenyl or a naphthalene.

Y denotes a dicarboxylic acid.

The term "dicarboxylic acid" denotes the aliphatic or cycloaliphatic acids having 4 and 18 carbon atoms.

We may mention for example adipic acid, sebacic acid, azelaic acid, suberic acid, butanedioic acid, 1,4-cyclohexyl-dicarboxylic acid.

Advantageously, the carboxylic acid is aliphatic and represents adipic acid, azelaic acid, sebacic or decanedioic acid, undecanedioic acid and dodecanedioic acid, brassylic acid, tetradecanedioic acid, hexanedioic acid or octadecanedioic acid.

The asymmetric diamine monomer of the piperazine type may therefore react randomly with a diacid by its NH part of the ring or terminal $NH_2$ carried by $Z_1$ or $Z_2$.

This asymmetry endows the condensation product obtained with an asymmetry, namely the latter consists of repeating units:

monomers of the "diamine.diacid" type derived from the reaction between an aliphatic diamine having from 4 to 36 carbon atoms, preferably from 4 to 18 carbon atoms and a dicarboxylic acid having from 4 to 36 carbon atoms, preferably from 4 to 18 carbon atoms; and their mixtures, with monomers with a different number of carbons in the case of mixtures between a monomer of the amino acid type and a monomer of the lactam type.

Monomers of the Amino Acid Type:

As examples of alpha,omega-amino acids, we may mention those having from 4 to 18 carbon atoms, such as the 7-aminoheptanoic, 11-aminoundecanoic, N-heptyl-11-aminoundecanoic and 12-aminododecanoic acids.

Monomers of the Lactam Type:

As examples of lactams, we may mention those having from 3 to 18 carbon atoms on the main ring, and which may be substituted. We may mention for example β,β-dimethylpropiolactam, α,α-dimethylpropiolactam, amylolactam, capryllactam also called lactam 8, oenantholactam and lauryllactam also called lactam 12.

The caprolactam also called lactam 6 and aminocaproic acid are excluded from the monomers of the amino acid or aminocarboxylic acid type or monomers of the lactam type.

Monomers of the "diamine.diacid" type:

As examples of dicarboxylic acid, the same diacids as those defined for Y may be mentioned.

As examples of diamine that may be used, in addition to the one of the piperazine type, we may mention the aliphatic diamines having from 4 to 36 atoms, preferably from 4 to 18 atoms, which may be aryl and/or saturated cyclic. As examples we may mention hexamethylenediamine, tetramethylenediamine, octamethylenediamine, decamethylenediamine, dodecamethylenediamine, 1,5-diaminohexane, 2,2,4-trimethyl-1,6-diaminohexane, diamine polyols, isophorone diamine (IPD), methyl pentamethylenediamine (MPMD), bis(aminocyclohexyl) methane (BACM), bis(3-methyl-4 aminocyclohexyl) methane (BMACM), meta-xylenediamine, and bis-p aminocyclohexylmethane.

As other examples of monomers of the "diamine.diacid" type, we may mention those resulting from the condensation of hexamethylenediamine with a C6 to C18 diacid, notably the monomers: 6.6, 6.10, 6.11, 6.12, 6.13, 6.14, 6.18. We

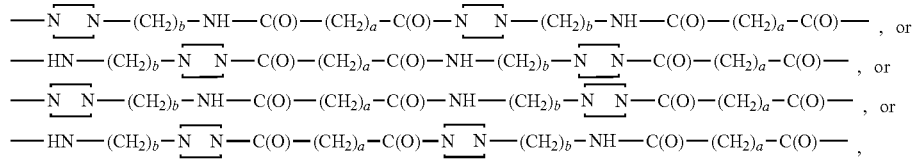

or a mixture thereof;

a representing an integer from 2 to 16.

AP.Y therefore denotes a polymer segment containing amide functions resulting from a polycondensation reaction between the carboxylic acid functions of the carboxylic acid Y and amine functions of the asymmetric diamine of the piperazine type AP.

Regarding Long-Chain Aliphatic Polyamide A:

"A" denotes the products of polymerization of monomers selected from:

monomers of the amino acid or aminocarboxylic acid type, and preferably alpha, omega-aminocarboxylic acids;

monomers of the lactam type having from 3 to 18 carbon atoms on the main ring, and which may be substituted;

may mention the monomers resulting from the condensation of decanediamine with a 06 to C18 diacid, notably the monomers: 10.10, 10.12, 10.13, 10.14, 10.18.

Advantageously, the PA used according to the invention is obtained at least partially from biosourced raw materials.

"Raw materials of renewable origin" or "biosourced raw materials" means materials that comprise biosourced carbon or carbon of renewable origin. In fact, in contrast to materials derived from fossil materials, materials composed of renewable raw materials contain 14C. The "content of carbon of renewable origin" or "content of biosourced carbon" is determined by applying standards ASTM D 6866 (ASTM D 6866-06) and ASTM D 7026 (ASTM D 7026-04).

As examples of amino acids of renewable origin, we may mention: 11-aminoundecanoic acid produced from castor oil for example, 12-aminododecanoic acid produced from castor oil for example, 10-aminodecanoic acid produced from decylenic acid obtained by metathesis of oleic acid for example, 9-aminononanoic acid produced from oleic acid for example.

As examples of diacids of renewable origin, we may mention, depending on the number x of carbons in the molecule (Cx):

C4: succinic acid from glucose for example;
C6: adipic acid from glucose for example;
C7: heptanedioic acid from castor oil;
C9: azelaic acid from oleic acid (ozonolysis) for example;
C10: sebacic acid from castor oil for example;
C11: undecanedioic acid from castor oil;
C12: dodecanedioic acid from biofermentation of dodecanoic add=lauric add (rich oil: cabbage palm and coconut oil) for example;
C13: brassylic acid from erucic acid (ozonolysis), which is found in colza for example;
C14: tetradecanedioic acid by biofermentation of myristic acid (rich oil: cabbage palm and coconut oil) for example.

As examples of diamines of renewable origin, we may mention, depending on the number x of carbons in the molecule (Cx):

C4: butanediamine obtained by amination of succinic acid;
C5: pentamethylenediamine (from lysine);

and so on for the diamines obtained by amination of the diacids of renewable origin mentioned above.

Advantageously, the average number of carbon atoms per nitrogen atom in A is greater than 6, in particular greater than 9.

Regarding Pip.Y:

Pip denotes piperazine, in which the two nitrogens of the ring carry a hydrogen, and are therefore of a symmetric character.

Y' is a carboxylic acid as defined for Y, moreover Y and Y' may represent the same diacid or a diacid different from one another.

Advantageously, Y' is selected from sebacic acid and undecanedioic acid.

The polyether unit B may correspond to polyether sequences with reactive ends, such as, among others:

1) polyoxyalkylene sequences with diamine chain ends, also called polyalkylene ether polyamine, obtained by cyanoethylation and hydrogenation of aliphatic dihydroxylated alpha-omega polyoxyalkylene sequences called polyalkylene ether diols (polyether dials).
2) polyoxyalkylene ether polyols (or polyalkylene ether polyols), notably a polyalkylene ether diol, also called polyether diols.

Advantageously, the polyalkylene ether polyol of the composition of the invention is selected from PPG, PTMG or a PEG-PPG mixture and the polyalkylene ether polyamine is selected from Elastamine® or Jeffamine® predominantly with PPG or PTMG blocks.

Y" is a carboxylic acid as defined for Y or Y'. Y, Y' and Y" may all represent the same diacid, or one of the Y, Y' and Y" represents a diacid different from the other two, which are identical, or Y, Y' and Y" are different from one another.

Pip.Y' therefore denotes a polymer segment containing amide functions resulting from a polycondensation reaction between the carboxylic acid functions of the carboxylic acid Y and amine functions of the piperazine Pip.

Regarding m, n and q:

m, n and q may, each independently of one another, represent 0 or 1.

m, n and q therefore represent only the presence or absence of the polymer segment with which it is associated.

Thus, for example, in the case of $(Pip.Y')_n$, when n=0, this signifies that Pip.Y' is not present and when n=1, Pip.Y' is present and then represents a polymer segment as defined above.

Consequently, general formula I may correspond, depending on the value of m, n and q, to the following polyamides: AP.Y or AP.Y/A or AP.Y/Pip.Y' or AP.Y/B.Y" or AP.Y/A/Pip.Y' or AR.Y/A/B.Y" or AR.Y/A/Pip.Y' or AP.Y/Pip.Y'/B.Y" or AP.Y/A/Pip.Y'/B.Y".

The melting points $Tm_1$ and $Tm_2$, the glass transition temperature and the crystallization temperature Tc, throughout the description, are measured by DSC, after a first heating/cooling/second heating cycle, according to standard ISO 11357-3:2013.

The temperature $Tm_1$ corresponds to the melting point in the first heating and the temperature $Tm_2$ corresponds to the melting point in the second heating. The heating and cooling rate is 20° C./min.

The inventors therefore found that the presence of at least one monomer resulting from the condensation of a diacid and a diamine of formula AP.Y, namely of an asymmetric piperazine AP and a diacid in the polyamides of the invention, therefore endowing them with an asymmetric character, made it possible on the one hand to lower the melting point $Tm_1$ of said polyamides while keeping them crystalline, i.e. avoiding said polyamides becoming amorphous, and on the other hand avoided the use of additional monomers for lowering the melting point of the polyamide.

In other words, for one and the same given $Tm_1$, the presence of monomers based on asymmetric piperazine makes it possible to use one less monomer, or even two less, compared to the polyamide in which the monomers based on piperazine are fully substituted with monomers based on symmetric diamines such as hexamethylenediamine AP.Y/A compared to 6.Y/A or 6.Y/A/A'.

As an example, a copolyamide of the invention such as AEP.12/12 consisting of two different monomers, i.e. a monomer resulting from the condensation of a C12 diacid and a diamine of formula AEP, AEP denoting aminoethylpiperazine, and a monomer consisting of lactam 12 or of aminododecanoic acid, has roughly the same $Tm_1$ as a copolyamide of the prior art consisting of four monomers (6/6.6/11/12: 30/20/20/30, proportions by weight): a monomer consisting of lactam 6 or an aminocaproic acid, a monomer resulting from the condensation of a C6 diacid and a C6 diamine, a monomer resulting from a C11 amino acid (aminoundecanoic acid) and a monomer resulting from a lactam 12 (lauryllactam), while preserving crystallinity.

The melting point and the glass transition temperature depend on the different monomers present in the polyamide of formula (I).

The polyamides of the invention, owing to their resistance to washing and their low melting point, make it possible to prepare hot-melt adhesives (HMAs), which are moreover free from volatile organic compounds (VOCs).

The enthalpy reflects the amount of crystals that there are in the polyamide.

Advantageously, the polyamides of the invention have an enthalpy above 10 J/g, in particular above 20 J/g, in particular above 30 J/g.

Advantageously, in the semicrystalline polyamide of formula (I) of the invention, the sum m+n+g is equal to 0 and said polyamide then has the following general formula (II):

AP.Y            (II), in which AP and Y are as defined above, said polyamide displaying a wide melting range in DSC and not exhibiting recrystallization.

Owing to the presence of an asymmetric piperazine, the homopolyamides of formula (II) display behaviour similar to that of the copolyamides, notably with a wide melting range, i.e. the melting peak $Tm_1$, is not finely defined but on the contrary it is wide.

They also have a slow rate of recrystallization, i.e. a melting point $Tm_2$ is not observed in the second heating in DSC and moreover they have the property of being very sticky in the molten state before they solidify, thus allowing holding of the assembly to be glued.

The polyamides of the invention that are sticky may be used for mats that allow application of the polyamide on a support. The polyamide is sufficiently sticky to stick to the support but not sticky enough to stick to the mat.

Advantageously, the melting point $Tm_1$ of said polyamides of formula (II) is less than or equal to about 130° C., in particular less than or equal to 120° C.

Advantageously, in the semicrystalline polyamide of formula (II) of the invention, AP represents aminoethylpiperazine (AEP) and Y is selected from adipic acid, sebacic acid, azelaic acid, dodecanedioic acid, brassylic acid, tetradecanedioic acid, hexanedioic acid and octadecanedioic acid.

In particular, the semicrystalline polyamide of formula (II) of the invention is selected from AEP.6, AEP.9, AEP.10, AEP.12 and AEP.14.

Moreover, the semicrystalline polyamide of formula (II) of the invention has solubility in an alcohol-water mixture, in particular an isopropanol-water mixture (85/15: v/v) at room temperature (i.e. 20° C.) of at least 15%.

Another advantage of the polyamides of formula (II) of the invention is that they are water-soluble, which gives them the advantage that they can be used in the form of solvent-based varnishes or glues, and can produce very thin layers of film.

Advantageously, in the semicrystalline polyamide of formula (I) of the invention, the sum m+n+q is different from 0, which signifies that at least one of m, n or q is equal to 1.

In a variant of the invention, the sum m+n is equal to 0 and q=1 in the semicrystalline polyamide of formula (I) of the invention, and said polyamide then has the following general formula (IIa):

AP.Y/(B.Y'')    (IIa),

AP, Y, B and Y'' being as defined above.

The presence of a polyether unit B makes it possible to increase the rate of recrystallization relative to the polyamides of formula (II) without having to add additional monomers of the diamine type.

The increase in the rate of recrystallization allows a Tim to be observed in the second heating in DSC.

Advantageously, in the semicrystalline polyamide of formula (I) of the invention, m=1 and the sum n+q is equal to 0, and said polyamide then has the following general formula (III):

AP.Y/A    (III), in which AP, Y and A are as defined above, said semicrystalline polyamide displaying a fast rate of recrystallization.

By adding at least one second polyamide with an aliphatic unit A to the first monomer AP.Y, it becomes possible to obtain copolyamides with binary or ternary structure having melting points that are lowered even more relative to the homopolyamide of structure AP.Y, but with the particular feature of displaying fast rates of recrystallization, the amino piperazine AP making it possible to lower the Tg.

The polyamides of formula (III) of the invention therefore offer the advantage, owing to their capacity for rapid recrystallization, of being able to be used for making coils rapidly. In fact, when the product is sticky, this application cannot be effected directly and the product must be deposited on a film, generally of polyethylene, which is then wound on itself and then unwound after drying for 1 to 2 days to enable the polyamide to be removed and then rewound, which increases the costs of production.

Advantageously, in the semicrystalline polyamide of formula (III) of the invention, A=A' and is obtained from the condensation of a lactam or of an amino acid, in particular selected from a PA11 and a PA 12, and said polyamide is represented by the general formula AP.Y/A' (IIIa), Advantageously, in the semicrystalline polyamide of formula (IIIa) of the invention, the weight ratio AP.Y/A' is from 40/60 to 99/1.

The presence of the asymmetric piperazine makes it possible to be able to increase the molar proportion of polyamide derived from the condensation of lactam or of amino acid present in the copolyamide relative to a copolyamide 6.A.

As an example, a 6/12 copolyamide (40/60 by weight) has a minimum $Tm_1$ of 125° C. and requires the presence of a third monomer such as PA6.6 to obtain a minimum $Tm_1$ of 110° C. (PA6/6.6/12: 35/30/35 by weight), whereas AEP.6/12 already has a $Tm_1$ below 125° C. with an increased proportion by weight of PA12 (70%), said Trill of AEP.6/12 decreasing further with the decrease in the molar proportion of PA12, and notably being only 102° C. with 40% of PA12.

Advantageously, said semicrystalline polyamide of formula (IIIa) has a $Tm_1$ less than or equal to about 130° C., in particular less than or equal to about 115° C. and/or a Tg less than or equal to about 45° C., in particular less than or equal to 35° C.

Advantageously, in the semicrystalline polyamide of formula (IIIa) of the invention, AP represents aminoethylpiperazine (AEP) and Y is selected from adipic acid, sebacic acid, azelaic acid, dodecanedioic acid, brassylic acid, tetradecanedioic acid; hexanedioic acid and octadecanedioic acid.

In particular, said semicrystalline polyamide of formula (IIIa) of the invention is selected from AEP.6/11, AEP.9/11, AEP.10/11, AEP.12/11, AEP.6/12, AEP.9/12, AEP.10/12, AEP.12/12, AEP.10/11/12 and AEP.12/11/12.

Advantageously, in the semicrystalline polyamide of formula (III) of the invention, A is derived from the condensation of a Cx aliphatic diamine with an aliphatic diacid Y represented by formula (IIIb) of the invention: AP.Y/Cx.Y (IIIb).

The Cx aliphatic diamine is as defined above for the aliphatic diamines, and similarly the aliphatic diacid Y is as defined above, and the two diacids Y may be identical or different.

Advantageously, Cx.Y is selected from 6.6, 6.10, 6.12 and 6.14.

Advantageously, in the semicrystalline polyamide of formula (IIIb), the AP.Y/A weight ratio is from 65/35 to 99/1.

Advantageously, said semicrystalline polyamide of formula (IIIb) has a Tim, less than or equal to about 150° C. and/or a Tg less than or equal to about 50° C., in particular less than or equal to 35° C.

Advantageously, in the semicrystalline polyamide of formula (IIIb), AP represents aminoethylpiperazine (AEP) and Y is selected from adipic acid, sebacic acid, azelaic acid, dodecanedioic acid, brassylic acid, tetradecanedioic acid, hexanedioic acid and octadecanedioic acid.

Advantageously, the two acids Y of formula (IIIb) are identical and in particular said semicrystalline polyamide of formula (IIIb) is selected from AEP.6/6.6, AEP.10/6.10, AEP.12/6.12 and AEP.14/6.14.

In a variant of the invention, m=1, n=0 and q=1 in the semicrystalline polyamide of formula (I) of the invention, and said polyamide then has the following general formula (IIIc):

AP.Y/A/(B.Y") (IIIc),

AP, A, Y, B and Y" being as defined above.

The presence of a polyether unit B makes it possible to increase the rate of recrystallization relative to the polyamides of formula (III).

Advantageously, in the semicrystalline polyamide of formula (I) of the invention, n=1, m=0 and q=0 or 1, and said polyamide then has the following general formula (IV):

AP.Y/Pip.Y'/(B.Y")$_q$ (IV), in which AP, Y, Pip, Y' and Y" are as defined above.

In a first variant, Y and Y' are identical in the semicrystalline polyamide of formula (IV) and q=0, said polyamide displaying a slow rate of recrystallization.

Said polyamide is then of the following general formula (IVa):

AP.Y/Pip.Y' (IVa).

Said polyamide of formula (IVa) has the advantage that it only recrystallizes slowly.

Advantageously, when Y and Y' are identical and q=0, said polyamide has a $Tm_1$, less than or equal to about 150° C., notably less than or equal to about 130° C., in particular less than or equal to about 120° C. and/or a Tg less than or equal to about 40° C., in particular less than or equal to 35° C. and a solubility in an alcohol-water mixture, in particular an isopropanol-water mixture (85/15:v/v) at room temperature (20° C.), of at least 15%.

Another advantage of the copolyamides of formula (IV) in which Y and Y' are identical is a decrease in the costs of preparation of said copolyamides on account of the presence of piperazine, which has a lower cost than an aminopiperazine.

Advantageously, the AP.Y/Pip.Y' weight ratio in the semicrystalline polyamide of formula (IV), in which Y and Y' are identical, is from 40/60 to 99/1.

Advantageously, in the semicrystalline polyamide of formula (IV) in which Y and Y' are identical, AP represents aminoethylpiperazine (AEP) and Y=Y' is selected from adipic acid, sebacic acid, azelaic acid, dodecanedioic acid, brassylic acid, tetradecanedioic acid, hexanedioic acid and octadecanedioic acid, in particular said semicrystalline polyamide is selected from AEP.10/Pip.10 and AEP 12/Pip.12.

In a second variant, in the semicrystalline polyamide of formula (IV) in which Y and Y' are identical, q=1 and said polyamide is of the following general formula (IVb):

AP.Y/Pip.Y'/B.Y" (IVb).

Said polyamide of formula (IVb) has the advantage, when this is necessary, of recrystallizing more quickly than the polyamides of formula (IVa).

In a third variant, Y and Y' are different in the semicrystalline polyamide of formula (IV) and q=0, said polyamide displaying a slow rate of recrystallization.

In this third variant, said polyamide has a $Tm_1$ less than or equal to about 100° C. and/or a Tg less than or equal to about 35° C.

The combination of at least two dicarboxylic acids Y and Y' with aminopiperazine makes it possible for the melting point as well as the Tg to be lowered considerably.

Advantageously, in this third variant, the AP/Pip molar ratio is from 50/50 to 20/80, in particular 35/65.

Advantageously, the Y/Y' molar ratio is from 15/85 to 85/15.

More advantageously, in this fourth variant, AP represents aminoethylpiperazine (AEP) and Y and Y' are selected from adipic acid, sebacic acid, azelaic acid, dodecanedioic acid, brassylic acid, tetradecanedioic acid, hexanedioic acid and octadecanedioic acid, and in particular said semicrystalline polyamide is selected from AEP.10/Pip.10/AEP.12/Pip.12.

In a fourth variant, in the semicrystalline polyamide of formula (Rib), q=1, said polyamide displaying a fast rate of recrystallization.

Advantageously, in this fourth variant, B is selected from PEG and a polyalkylene ether polyamine, in particular a Jeffamine®. For example Jeffamine® D400, D2000, ED 2003, XTJ 542, commercial products from the company Huntsman.

In particular the Jeffamine is EDR, notably EDR 148.

The copolyamides of the invention are synthesized conventionally, in the presence of chain limiters or chain terminators if required.

The chain terminators that are suitable for reacting with the amine end function may be monocarboxylic acids, anhydrides, such as phthalic anhydride, monohalogenated acids, monoesters or monoisocyanates.

Preferably, the monocarboxylic acids are used. They may be selected from the aliphatic monocarboxylic acids, such as acetic acid, propionic acid, lactic acid, valeric acid, caproic acid, capric acid, lauric acid, tridecyl acid, myristic acid, palmitic acid, stearic acid, pivalic acid and isobutyric acid; alicyclic acids, such as cyclohexanecarboxylic acid; aromatic monocarboxylic acids; such as benzoic acid, toluic acid, α-naphthalenecarboxylic acid, β-naphthalenecarboxylic acid, methylnaphthalene carboxylic acid and phenylacetic acid; and mixtures thereof. The preferred compounds are the aliphatic acids, and notably acetic acid, propionic acid, lactic acid, valeric acid, caproic acid, capric acid, lauric acid, tridecyl acid, myristic acid, palmitic acid and stearic acid.

Among the chain terminators suitable for reacting with the acid end function, we may mention the monoamines, monohydric alcohols, monoisocyanates.

Preferably, the monoamines are used. They may be selected from aliphatic monoamines, such as methylamine, ethylamine, propylamine, butylamine, hexylamine, octylamine, decylamine, laurylamine, stearylamine, dimethylamine, diethylamine, dipropylamine and dibutylamine; alicyclic amines, such as cyclohexylamine and dicyclohexylamine; aromatic monoamines, such as aniline, toluidine, diphenylamine and naphthylamine; and mixtures thereof.

The preferred compounds are butylamine, hexylamine, octylamine, decylamine, laurylamine, stearylamine, cyclohexylamine and aniline.

The chain limiters may also be a dicarboxylic acid, which is introduced in excess relative to the stoichiometry of the diamine or diamines; or else a diamine, which is introduced in excess relative to the stoichiometry of the diacid or diacids.

According to another aspect, the present invention relates to a composition comprising a polyamide as defined above.

Advantageously; the composition defined above further comprises additives selected from antioxidants; UV stabilizers; optical brighteners and mixtures thereof.

According to yet another aspect, the present invention relates to the use of at least one monomer resulting from the condensation of a diacid and a diamine of formula AP.Y for preparing a semicrystalline polyamide as defined above; said polyamide having a Tim less than or equal to about 150° C., notably less than or equal to about 130° C., in particular less than or equal to about 120° C. and/or a Tg less than or equal to about 60° C., in particular less than or equal to about 50° C., notably less than or equal to about 40° C.

According to another aspect, the present invention relates to the use of a semicrystalline polyamide as defined above or of a composition as defined above, for manufacturing a hot-melt adhesive, in particular a thin sheet, a film, granules, a filament, a mat, a powder or a suspension.

The thickness of the adhesive, apart from the filament, granules, powder or suspension according to the invention, is from 5 to 200 µm (equivalent to 5 to 200 g/m² which corresponds to another unit of measurement), in particular from 5 to 100 µm depending on the type of adhesive used, for example the thickness of a thin sheet is from 5 to 30 µm, the thickness of a film is from 20 to 100 µm, and the thickness of a mat is from 10 to 50 µm.

Regarding filaments, there is no weight per unit of surface area, but a weight per 1 km of thread.

Regarding powder, 5 types of powders may be used, notably selected from:
from more than 0 to 80 microns
from more than 0 to 120 microns
from 80 to 180 microns
from 80 to 200 microns
from 200 to 500 microns Regarding suspensions, the above powder is suspended, notably in water, in particular at a concentration from 40% to 50%.

Advantageously, a semicrystalline polyimide as defined above or a composition as defined above is used in the context of the textile industry, notably for the manufacture of seamless sports articles.

Advantageously, said composition, used above for manufacturing a hot-melt adhesive, is free from plasticizer.

The invention is described in more detail with the aid of the figures and examples according to the invention, which do not in any way limit the latter.

Tg: 36.9° C. and $Tm_1$=102.5° C. (first heating), no $Tm_2$ in second heating, non-crystalline product.

Figure 1:
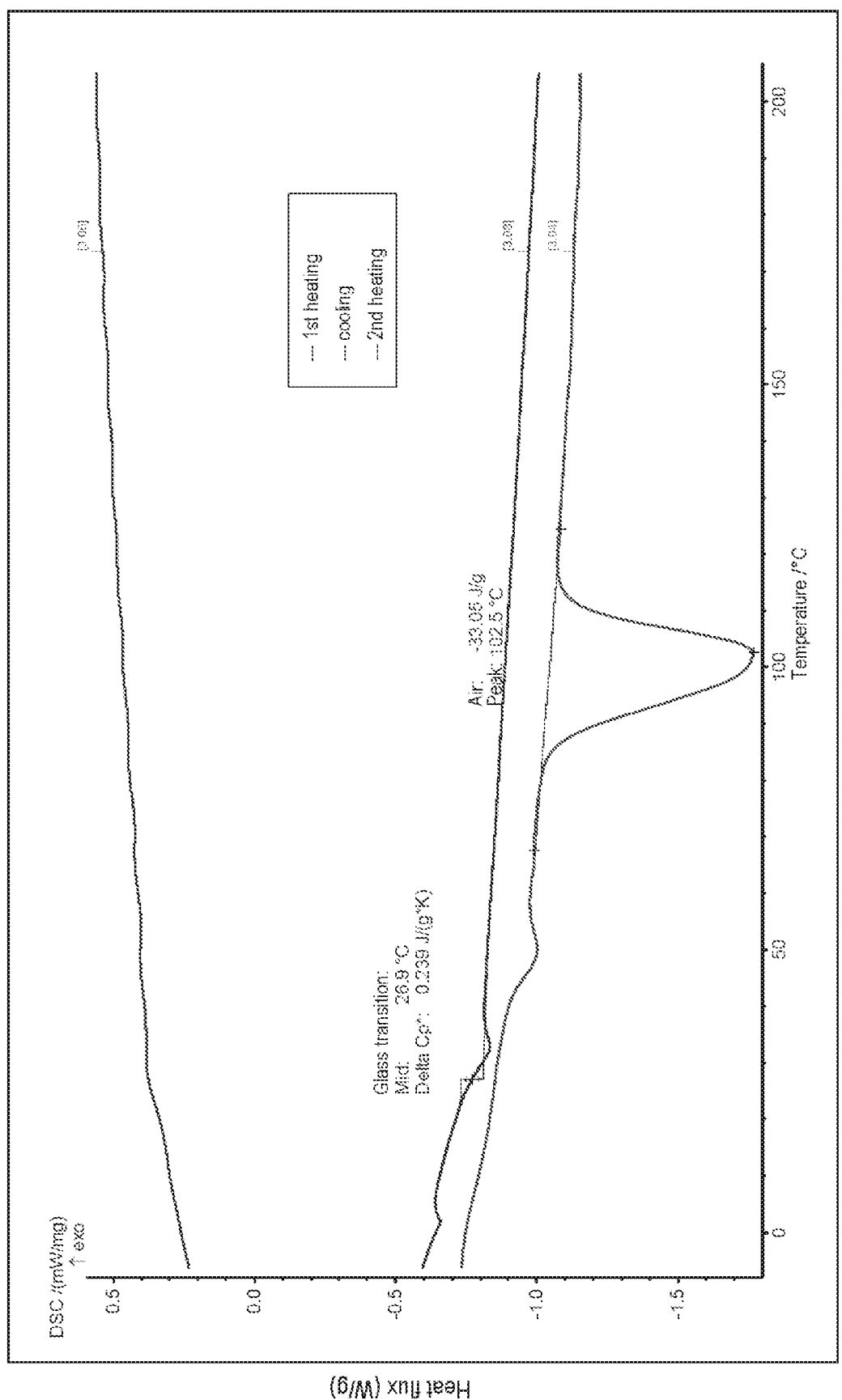
FIG. 1 shows the DSC thermogram obtained with a copolyamide of the prior art of the platamide type (6/6.6/11/12 with respective proportions by weight 30/20/20/30). From bottom to top, first heating curve, second heating curve and cooling curve.
Figure 2:
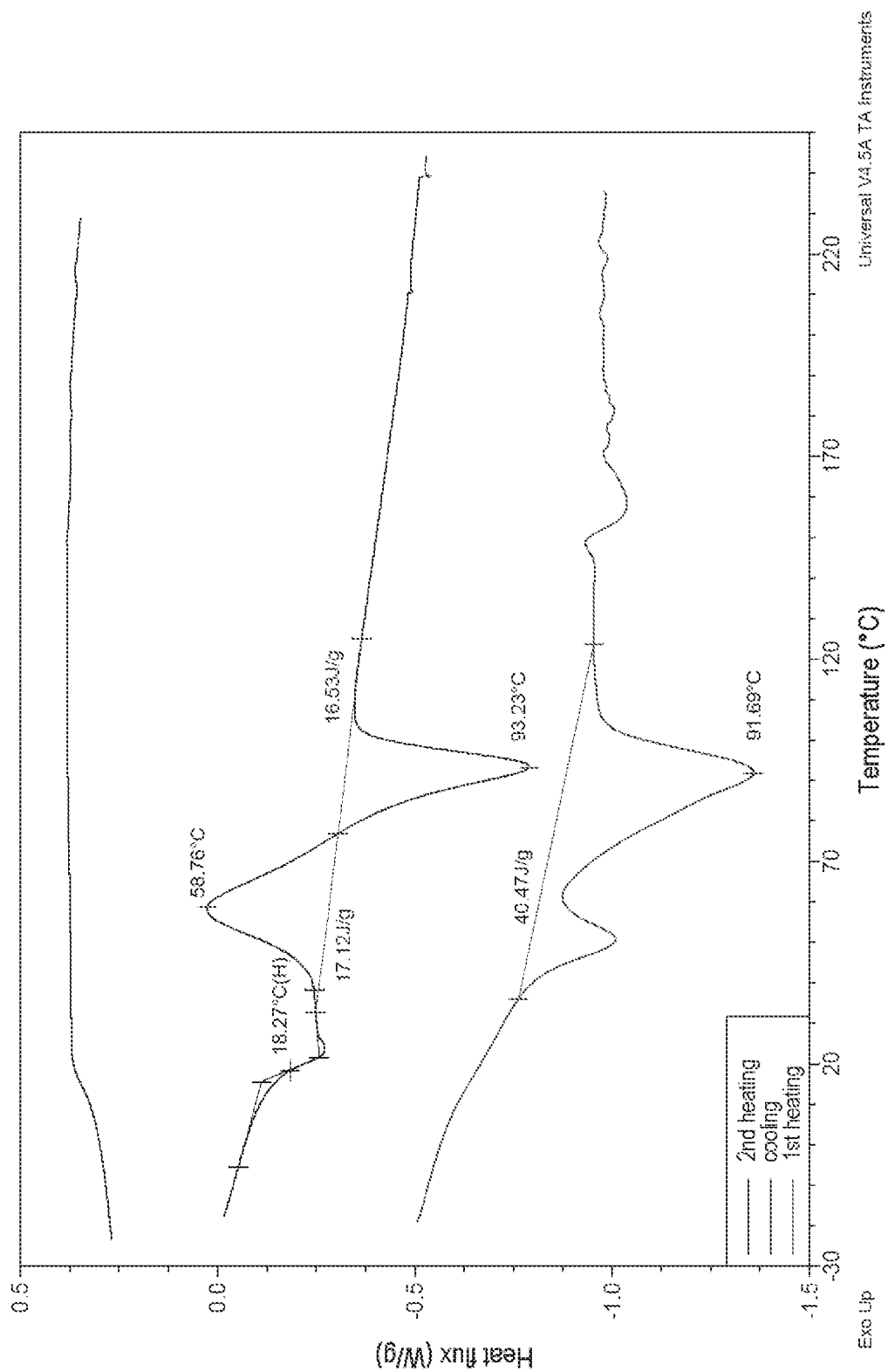

FIG. 2 shows the DSC thermogram obtained with a copolyamide of the invention (AEP.12/12: 65/35 by weight). From bottom to top, first heating curve, second heating curve and cooling curve.

Tg: 18.3° C. and $Tm_1$=91.7° C. (first heating), $Tm_2$=93.2° C. (second heating), Tc=58.8° C., crystalline product.

Figure 3:
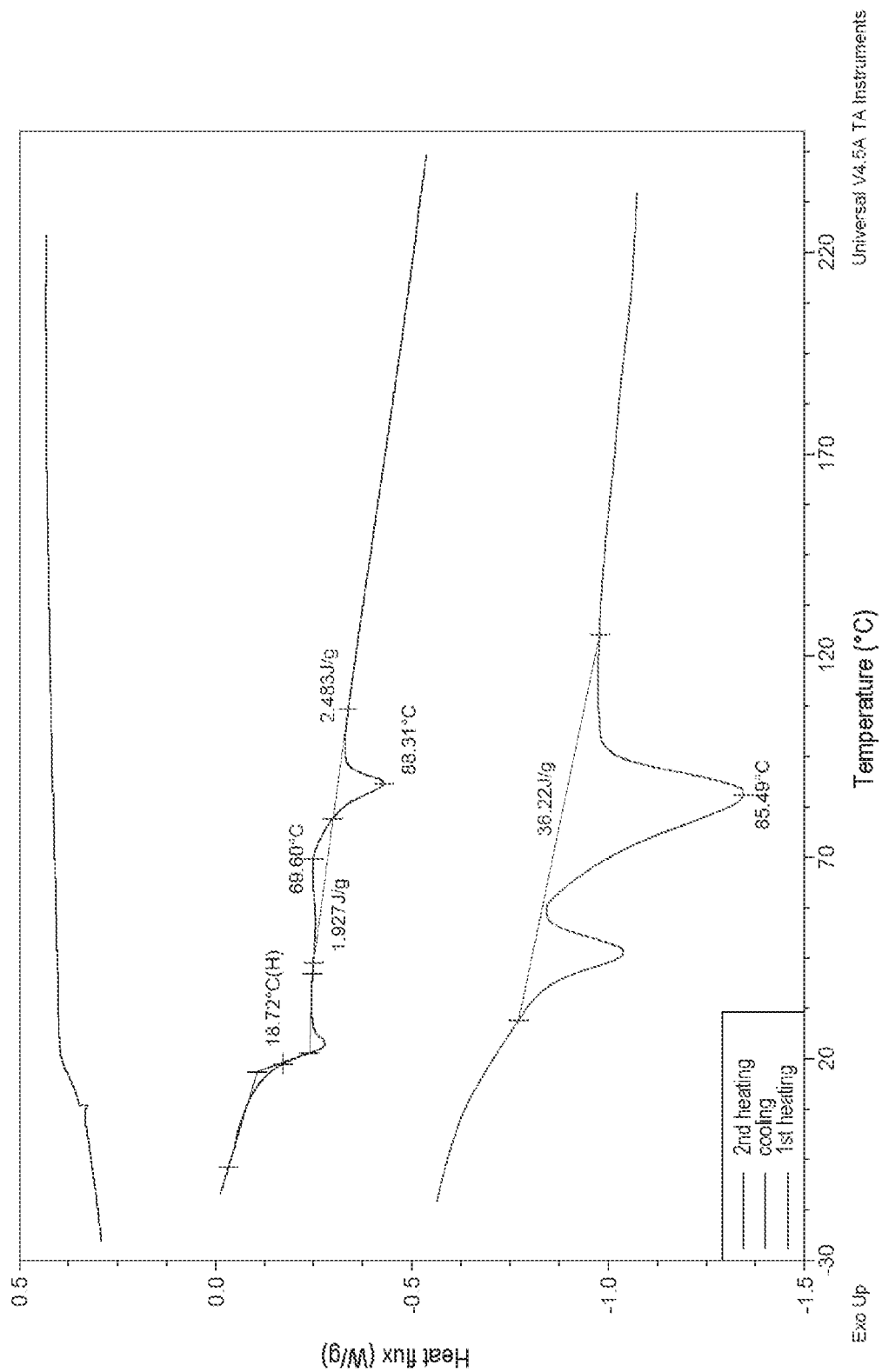

FIG. 3 shows the DSC thermogram obtained with a copolyamide of the invention (AEP.12/12: 70/30 by weight). From bottom to top, first heating curve, second heating curve and cooling curve.

Tg: 18.7° C. and $Tm_1$=85.5° C. (first heating), $Tm_2$=88.3° C. (second heating), Tc=69.6° C., crystalline product.

Figure 4:
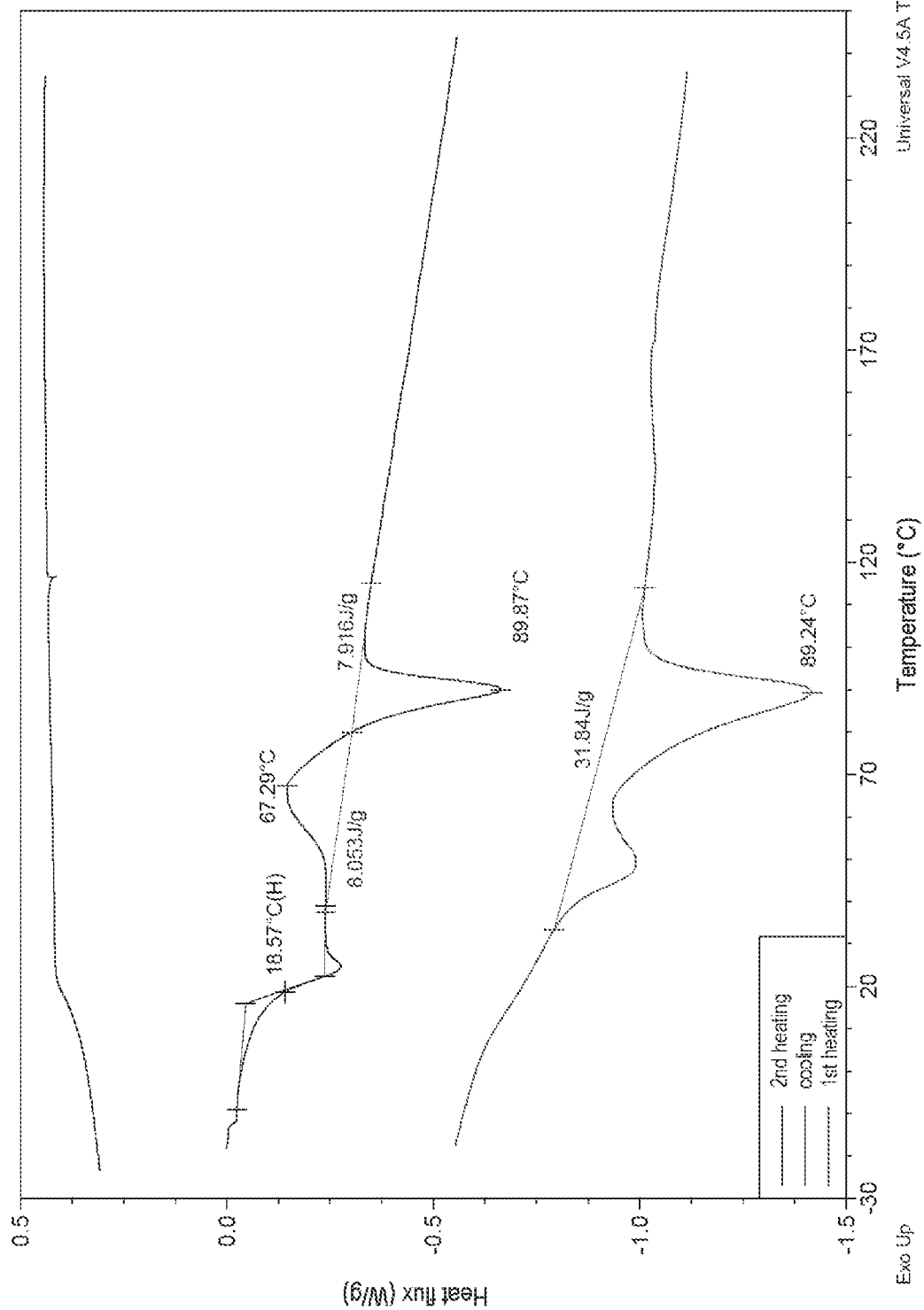

FIG. 4 shows the DSC thermogram obtained with a copolyamide of the invention (AEP.12/11/12: 60/20/20 by weight). From bottom to top, first heating curve, second heating curve and cooling curve.

Tg: 18.6° C. and $Tm_1$=89.2° C. (first heating), $Tm_2$=89.9° C. (second heating), Tc=67.3° C., crystalline product.

Figure 5:
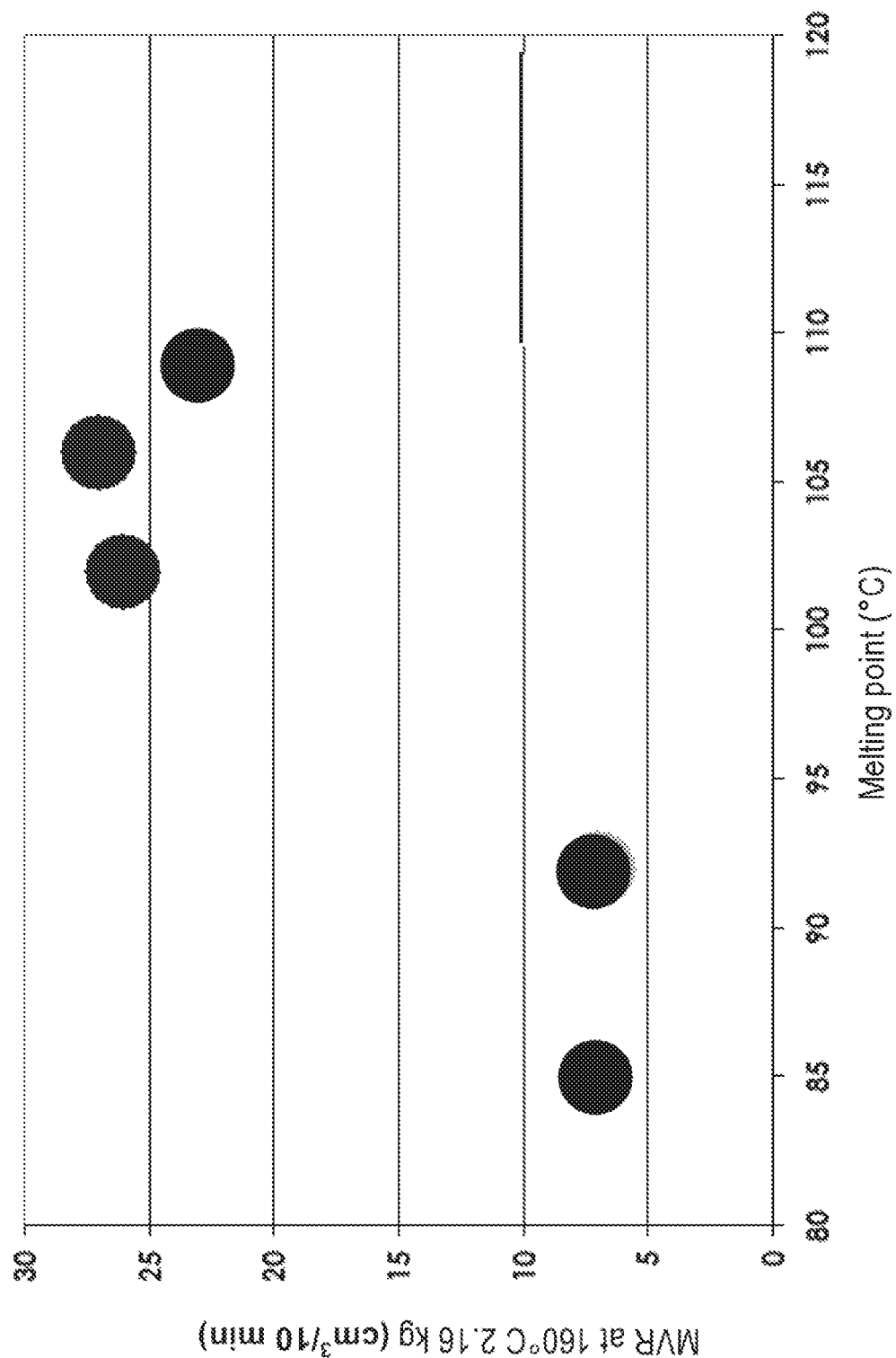

FIG. 5 shows the melting points and the MVRs of different copolyamides of the invention, without caprolactam, compared to those obtained with copolyamides comprising caprolactam.

It shows, from left to right, the copolyamides of the invention without caprolactam: AEP.12/12 (70/30 by weight), AEP.12/12 (65/35 by weight), and the copolyamides of the prior art with caprolactam: 6/6.6/11/12 (respective proportions by weight 30/20/20/30), 6/Pip.12/12 (respective proportions by weight 30/20/50), and 6/6.6/12 (respective proportions by weight 35/20/45).

This figure shows that the copolyamides of the invention without caprolactam, compared to the copolyamides with caprolactam, display a lowering of the melting point, a property that is important for adherence when gluing to fabric.

The MVR (melting volume rate, which corresponds to the melt flow index) of the polyamides of the invention is determined according to standard ISO 1133-2 (2011).

EXAMPLES

Example 1: Preparation of the Polyamides of the Invention

The polyamides of the invention are prepared according to the techniques known by a person skilled in the art, for example, for synthesis of AEP.10/Pip.10 40/60, which is representative of all the syntheses of the invention:

A glass reactor, equipped with a stirrer of the anchor type, is charged with 10.75 g of piperazine, 9.36 g of N-aminoethylpiperazine and 39.89 g of sebacic acid. The mixture is inerted by vacuuming and then by introducing nitrogen 4 times in succession. Then the reaction mixture is heated under a nitrogen stream. When the material temperature reaches 180° C., the stirring is switched on. One hour after the material temperature reaches 250° C., vacuum (below 100 mbar) is applied. The medium become viscous and synthesis is stopped until the desired stirring torque is reached.

The product obtained is yellow and translucent.

The melting points $Tm_1$, and $Tm_2$, glass transition temperature (Tg), enthalpy and crystallization temperature (Tc) are measured by DSC (differential scanning calorimetry) in accordance with standard ISO 11357-2 (2013) and standard ISO 11357-3 (2013), according to the following protocol:
1: Equilibrate at 20.00° C.
2: Cool at a rate of 10.00° C./min to −50.00° C.
3: Maintain this temperature for 5.00 min
4: Heat at a rate of 20.00° C./min to 250.00° C.
5: Maintain this temperature for 5.00 min
6: Cool at a rate of 10.00° C./min to −50.00° C.
7: Maintain this temperature for 5.00 min
8: Heat at a rate of 20.00° C./rain to 250.00° C.

Various polyamides were prepared, with the characteristics detailed below, and notably the following polyamides: AEP.Y/A, AEP and notably the following polyamides: AEP.Y, AEP.Y/A, AEP.Y/6.Y, AEP.YPip.Y and AEP.Y/AEP.Y'/Pip.Y/Pip.Y'.

All the products obtained have an intrinsic viscosity above 0.4 as determined according to ISO 307 but changing the solvent (use of m-cresol in place of sulphuric acid and the temperature being 20° C.).

Example 2: AEP.Y and AEP.Y/A (Y=6, 9, 10, 12 and a Represents A', A'=11 or 12)

The percentages of each monomer are stated by weight.

| Description | | $Tm_1$ | Tg | $Tm_2$ | Tc | enthalpies (J/g) |
|---|---|---|---|---|---|---|
| AEP.6/12 | 20/80 | 154.9 | 30 | 145.9 | 71.8 | 36 |
| | 40/60 | 128.7 | 26 | 121.3 | 88 | 3 |
| | 60/40 | 102 | 33 | — | | |
| | 80/20 | 115 | 44 | — | | |
| | 100/0 | 145 | 54 | — | | |
| AEP.9/12 | 20/80 | 151.5 | 27 | 152.5 | 96.6 | 43 |
| | 40/60 | 131.8 | 19 | 129.3 | 50.6 | 27 |
| | 60/40 | 99.9 | 21 | — | | |
| | 80/20 | 87 | 25 | — | | |
| | 100/0 | 115 | 32 | — | | |
| AEP.10/12 | 20/80 | 160.2 | 27 | 156.4 | 106.9 | 50 |
| | 40/60 | 137.7 | 20 | 126 | 37.2 | 29 |
| | 60/40 | 104.1 | 20 | — | | |
| | 80/20 | 98.4 | 24 | — | | |
| | 100/0 | 121 | 30 | — | | |
| AEP.12/12 | 20/80 | 160.9 | 29 | 158.3 | 113.1 | 48 |
| | 40/60 | 137.5 | 24 | 136.7 | 68.4 | 37 |
| | 50/50 | 117.2 | 24 | 115.8 | 46 | 24 |
| | 60/40 | 105.2 | 20 | 99.2 | 52 | 21 |
| | 65/35 | 96.5 | 21 | 96.2 | 66 | 14 |
| | 70/30 | 82.3 | 21 | 90.8 | 72 | 2 |
| | 80/20 | 82 | 17 | | | |
| | 100/0 | 120.2 | 19 | | | |
| AEP.6/11 | 20/80 | 159.4 | 32 | 158.5 | 109.7 | 46 |
| | 40/60 | 132 | 27 | 122.9 | 80 | 27 |
| | 60/40 | 100.7 | 34 | | | |
| | 80/20 | 140 | 44 | | | |
| | 100/0 | 145 | 57 | | | |
| AEP.9/11 | 20/80 | 164.5 | 30 | 162.3 | 120 | 53 |
| | 40/60 | 132.7 | 20 | 130.3 | 47.8 | 35 |
| | 60/40 | 96.9 | 22 | | | |
| | 80/20 | 55 | 25 | | | |
| | 100/0 | 115 | 32 | | | |
| AEP.10/11 | 20/80 | 164.9 | 29 | 161.7 | 116.3 | 49 |
| | 40/60 | 135.6 | 26 | 127.7 | 47.9 | 28 |
| | 60/40 | 89 | 22 | | | |
| | 80/20 | 59 | 26 | | | |
| | 100/0 | 121 | 30 | | | |
| AEP.12/11 | 20/80 | 172.9 | 30 | 167.5 | 127.3 | 50 |
| | 40/60 | 146.6 | 25 | 140.8 | 73.4 | 35 |
| | 60/40 | 108.5 | 21 | 102.1 | 69 | 11 |
| | 80/20 | 90.6 | 18 | | | |
| | 100/0 | 120.2 | 19 | | | |

Example 3: AEP.Y/A (Y=12 and A Represents A', A'=11 and 12)

The percentages of each monomer are stated by weight

| Description | | $Tm_1$ | Tg | $Tm_2$ | Tc | enthalpies (J/g) |
|---|---|---|---|---|---|---|
| AEP.12/11/12 | 60/20/20 | 89 | 19 | 90 | 67 | 8 |

Example 4: AEP.Y/Cx.Y (Y=6, 10, 12 and 14, Cx=6)

The percentages of each monomer are stated by weight

| Description | $Tm_1$ | Tg | $Tm_2$ | Tc | enthalpies (J/g) |
|---|---|---|---|---|---|
| AEP.6/6.6 (0/100) | 256.3 | 48 | 255.3 | 229 | 85 |
| AEP.6/6.6 (20/80) | 236.6 | 51 | 233.6 | 190 | 57 |
| AEP.6/6.6 (40/60) | 207 | 51 | 203.1 | 135 | 44 |
| AEP.6/6.6 (60/40) | 161.4 | 50 | | | |
| AEP.6/6.6 (80/20) | 137.4 | 51 | | | |
| AEP.10/6.10 (80/20) | 118 | 30 | | | |
| AEP.10/6.10 (60/40) | 160 | 30 | 155.3 | 92 | 27 |
| AEP.10/6.10 (40/60) | 185 | 35 | 181.2 | 105 | 41 |
| AEP.10/6.10 (20/80) | 206 | 34 | 204.9 | 159 | 75 |
| PA 6.10 | 222 | 31 | 218.5 | 186 | 108 |
| AEP.12/6.12 (0/100) | 216.4 | 37 | 214.1 | 189 | 106 |
| AEP.12/6.12 (20/80) | 200.7 | 24 | 197.4 | 168 | 80 |
| AEP.12/6.12 (40/60) | 187.1 | 15 | 183.6 | 151 | 79 |
| AEP.12/6.12 (60/40) | 165.8 | 16 | 161.4 | 117 | 56 |
| AEP.12/6.12 (80/20) | 129.6 | 24 | | | |
| AEP.14/6.14 (0/100) | 211.1 | 38 | 208.9 | 188 | 96 |
| AEP.14/6.14 (20/80) | 189.3 | 29 | 186.7 | 151 | 70 |
| AEP.14/6.14 (40/60) | 179.4 | 25 | 176.7 | 144 | 72 |
| AEP.14/6.14 (60/40) | 158.5 | 23 | 154.6 | 94 | 44 |
| AEP.14/6.14 (80/20) | 130.2 | 15 | 127.8 | 28 | 35 |
| AEP.14/6.14 (100/0) | 121.9 | 18 | 119.4 | 26 | 28 |

Example 5: AEP.Y/Pip.Y (Y=10 and 12)

The percentages of each monomer are stated by weight

| Description | $Tm_1$ | Tg | $Tm_2$ | Tc | enthalpies (J/g) |
|---|---|---|---|---|---|
| AEP.12/PIP.12 (15/85) | 134 | 28 | 136.9 | 76 | 33 |
| AEP.12/PIP.12 (30/70) | 115 | 24 | 117.9 | 51 | 28 |
| AEP.12/PIP.12 (35/65) | 108 | 20 | 107.2 | 49 | 27 |
| AEP.12/PIP.12 (40/60) | 97 | 26 | 104.6 | 82 | 5 |
| AEP.12/PIP.12 (50/50) | 85 | 24 | | | |
| AEP.12/PIP.12 (60/40) | 55 | 24 | | | |
| AEP.12/PIP.12 (80/20) | 98 | 24 | | | |
| Pip.10/AEP.10 (wt % 20/80) | 111 | 29 | | | |
| Pip.10/AEP.10 (wt %: 40/60) | — | 29 | | | |
| Pip.10/AEP.10 (wt %: 50/50) | 100 | 30 | | | |
| Pip.10/AEP.10 (wt %: 60/40) | 119 | 28 | | | |
| Pip.10/AEP.10 (wt %: 70/30) | 132 | 32 | | | |
| Pip.10/AEP.10 (wt %: 85/15) | 158 | 32 | 99 | 158 | 44.5 |
| Pip.10/AEP.6 (wt %: 70/30) | 149 | 40 | 88 | 149 | 14 |

Example 6: AEP.Y/AEP.Y'/Pip.Y/Pip.Y' with and without B.Y/B.Y' (Y=10 and Y'=12)

The proportions of each monomer are stated in moles.

| | Molar composition | | | | | | | | | | | | | | | |
|---|---|---|---|---|---|---|---|---|---|---|---|---|---|---|---|---|
| AEP | 35 | 35 | 35 | 35 | 35 | 35 | 35 | 20 | 35 | 20 | 35 | 35 | 35 | 35 | 30 | 30 |
| Pip | 65 | 65 | 65 | 65 | 65 | 65 | 65 | 65 | 65 | 65 | 65 | 65 | 65 | 65 | 70 | 70 |
| Jeffamine EDR148 | | | | | | | | 15 | | 15 | | | | | | |
| DC10 | 100 | 80 | 60 | 40 | 20 | | 30 | 20 | 25 | 30 | 35 | 22 | 21 | 77 | 22 | 77 |
| DC12 | | 20 | 40 | 60 | 80 | 100 | 70 | 80 | 85 | 70 | 75 | 82 | 81 | 27 | 82 | 27 |
| PEG 600 | | | | | | | | 10 | | 10 | 4 | 2 | 4 | | 4 | 4 |
| Tm1 | 123 | 104 | 82 | 84 | 91 | 108 | 78 | 91 | 83 | 82 | 89 | 91 | 91 | 103 | 97 | 109 |
| Tg | 25 | 23 | 21 | 21 | 18 | 20 | 26 | 17 | 2 | 16 | −1 | 9 | 17 | 10 | 12 | 9 |
| Tm2 | — | — | — | — | 88.1 | 107.2 | — | 92 | 82 | 87 | 73 | 89 | 91 | — | 97 | 114 |
| Tc | — | — | — | — | 61 | 49 | — | 72 | 34 | 74 | 32 | 45 | 63 | — | 40 | 80 |
| Enthalpy (J/g) | — | — | — | — | 17 | 27 | — | 9 | 16 | 2 | 17 | 19 | 13 | — | 21 | 2 |

Example 7: Test of Adherence of the Copolyamides of the Invention and of Resistance to Washing Laminator: Model HP-450M,MS
Pressure: 1.0 kg/cm$^2$
  gluing time: 25 s
Peeling machine: Hongda Tensometer
Peeling test at 150 mm/min
Number of washing cycles: 2
The various heat-sensitive adhesives are submitted to two machine washings at 60° C. for 1.5 h for each washing and then to drying.
Types of textiles:
Cotton (90% cotton, 10% polyester)
The sample of cotton is 150 mm long and 50 mm wide.
The copolyamide film to be glued to the sample measures 40 µm in thickness.
The results are presented in the following table.

| Copolyamide | Melting point (° C.) | Heat-sealing temperature | Initial adhesive force (N/cm) | Retention of the properties of adherence after 2 washings and then drying (%) |
|---|---|---|---|---|
| 6/6.6/11/12 (30/20/20/30 by weight) | 102 | 160° C. | 5.8 | 58% |
| AEP.12/12 (65/35 by weight) | 92 | 180° C. | 5.4 | 66% |
| AEP.12/12 (70/30 by weight) | 85 | 180° C. | 4.0 | 65% |

The invention claimed is:

1. A semicrystalline polyamide comprising at least one monomer resulting from the condensation of a diacid and a diamine of formula AP.Y, wherein:
AP represents at least one asymmetric diamine monomer of the piperazine type with the following formula:

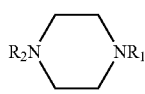

wherein:
$R_1$ represents H or —$Z_1$—$NH_2$ and $Z_1$ represents an alkyl, a cycloalkyl or an aryl having up to 15 carbon atoms,
$R_2$ represents H or —$Z_2$—$NH_2$ and $Z_2$ represents an alkyl, a cycloalkyl or an aryl having up to 15 carbon atoms,
$R_1$ and $R_2$ being different from one another, and
Y represents at least one dicarboxylic acid excluding the dimers and/or trimers of fatty acids,
said semicrystalline polyamide having the following general formula (IV):

AP.Y/Pip.Y' wherein:
A represents at least one polyamide with a long-chain aliphatic unit, excluding PA6,
Pip denotes piperazine and Y' represents at least one dicarboxylic acid excluding the dimers and/or trimers of fatty acids, and Y and Y' may be identical or different,
Y" represents at least one dicarboxylic acid excluding the dimers and/or trimers of fatty acids, and Y" may be identical to or different from
Y and/or Y'
and said semicrystalline polyamide has a $Tm_1$ less than or equal to about 150° C., and/or a Tg less than or equal to about 40° C., as determined by DSC according to standard ISO 11357-3 (2013) and ISO 11357-2 (2013), respectively, and a solubility in an alcohol-water mixture, in particular an isopropanol-water mixture (85/15: v/v) at room temperature (20° C.) of at least 15%, and the AP.Y/Pip.Y' weight ratio is from 40/60 to 99/1.

2. The semicrystalline polyamide according to claim 1, wherein AP represents aminoethylpiperazine (AEP) and Y=Y' is selected from adipic acid, sebacic acid, azelaic acid, dodecanedioic acid, brassylic acid, tetradecanedioic acid, hexanedioic acid and octadecanedioic acid.

3. The semicrystalline polyamide according to claim 1, wherein said polyamide is selected from AEP.10/Pip.10 and AEP 12/Pip.12.

4. The semicrystalline polyamide according to claim 1, said polyamide having a $Tm_1$ less than or equal to about 100° C. and/or a Tg less than or equal to about 35° C.

5. The semicrystalline polyamide according to claim 1, wherein the Y/Y' molar ratio is from 15/85 to 85/15.

6. The semicrystalline polyimide according to claim 1, wherein AP represents aminoethylpiperazine (AEP) and Y and Y' are selected from adipic acid, sebacic acid, azelaic acid, dodecanedioic acid, brassylic acid, tetradecanedioic acid, hexanedioic acid and octadecanedioic acid.

* * * * *